United States Patent
Wohlrabe

(10) Patent No.: US 6,930,484 B2
(45) Date of Patent: Aug. 16, 2005

(54) SUPPLEMENTARY DEVICE FOR A SMALL ELECTRIC APPLIANCE

(75) Inventor: Frank Wohlrabe, Kronberg (DE)

(73) Assignee: Braun GmbH, Kronberg (DE)

(*) Notice: Subject to any disclaimer, the term of this patent is extended or adjusted under 35 U.S.C. 154(b) by 0 days.

(21) Appl. No.: 10/386,300

(22) Filed: Mar. 11, 2003

(65) Prior Publication Data

US 2003/0173973 A1 Sep. 18, 2003

Related U.S. Application Data

(62) Division of application No. 09/564,215, filed on May 4, 2000, now Pat. No. 6,531,873.

(30) Foreign Application Priority Data

May 18, 1999 (DE) .......................... 199 21 677

(51) Int. Cl.⁷ ............................................ G01R 31/327
(52) U.S. Cl. ...................................................... 324/422
(58) Field of Search ........................... 30/41, 537–541, 30/DIG. 1; 324/422, 415; 318/114

(56) References Cited

U.S. PATENT DOCUMENTS

| | | | |
|---|---|---|---|
| 3,026,504 A | 3/1962 | Aurand et al. | |
| 3,835,377 A | 9/1974 | Kataoka | |
| 4,665,399 A | 5/1987 | Fauser et al. | |
| 4,932,246 A | 6/1990 | Deutsch et al. | |
| 5,111,580 A | 5/1992 | Bosscha et al. | |
| 5,304,935 A | 4/1994 | Rathke et al. | |
| 5,536,979 A | 7/1996 | McEachern et al. | |
| 5,614,030 A | 3/1997 | Braun | |
| 5,656,917 A | 8/1997 | Theobald | |
| 5,861,729 A | 1/1999 | Maeda et al. | |
| 5,994,855 A * | 11/1999 | Lundell et al. | 318/114 |
| 5,997,344 A | 12/1999 | Shinozaki | |
| 6,040,778 A | 3/2000 | Hopkins et al. | |
| 6,150,940 A | 11/2000 | Chapman et al. | |
| 6,194,870 B1 | 2/2001 | Kim | |
| 6,232,781 B1 | 5/2001 | Goser et al. | |
| 6,326,884 B1 * | 12/2001 | Wohlrabe | 340/310.01 |

FOREIGN PATENT DOCUMENTS

| | | |
|---|---|---|
| DE | 4036373 C2 | 4/1993 |
| DE | 4402236 A1 | 7/1995 |
| DE | 4409736 A1 | 9/1995 |
| DE | 19606719 A1 | 8/1997 |
| DE | 197 27 639 | 2/1998 |
| DE | 19817273 A1 | 10/1999 |

OTHER PUBLICATIONS

User Manual, Braun Dental Center OC 30, Type 4803, Nov. 1990.

* cited by examiner

Primary Examiner—Anjan Deb
Assistant Examiner—Amy He
(74) Attorney, Agent, or Firm—Fish & Richardson P.C.

(57) ABSTRACT

A supplementary device, such as a charging, cleaning and/or diagnosis device, for a small electric device, such as an electric hair cutting or hair removal apparatus or an electric toothbrush, but particularly for an electric shaving apparatus, includes an arrangement to detect whether it is connected electrically and/or magnetically to the small electric device, and an arrangement to discriminate between different types of small electric device. This arrangement monitors an electric and/or magnetic quantity prevailing at the connection of the supplementary device. A method for detecting the presence of an electric and/or magnetic connection between said devices includes monitoring an electric and/or magnetic quantity prevailing at the connection of the supplementary device.

14 Claims, 2 Drawing Sheets

SUPPLEMENTARY DEVICE FOR A SMALL ELECTRIC APPLIANCE

This application is a divisional of U.S. Pat. Ser. No. 09/564,215, filed May 4, 2000, issued Mar. 11, 2003 as U.S. Pat. No. 6,531,873, claiming priority under 35 U.S.C §119(a) from German application 19921677.0, filed May 18, 1999.

BACKGROUND

This invention relates to a supplementary device, such as a charging, cleaning and/or diagnosis device, for a small electric device, such as an electric hair cutting or hair removal apparatus or an electric toothbrush, but particularly for an electric shaving apparatus, and a method for detecting the presence of an electric and/or magnetic connection between said devices.

A method for transmitting data between a small electric device, such as an electric hair cutting apparatus, an electric toothbrush or a domestic appliance, and an electric supplementary device, such as a charging, cleaning or diagnosis device designed to be connected to it, is described along with accordingly designed devices in DE 198 17 273. Data is transmitted along electric and/or magnetic routes, e.g., in the case of a small electric device equipped with a power socket via the electric power socket and in the case of a small electric device powered by a primary battery via the battery contacts. The transmission of data is also understood to mean the transmission of control commands which, issued from the supplementary device for example, can activate particular functions of the small electric device. If, for example, the small electric device is an electric shaving apparatus and the supplementary device a cleaning device for the shaving apparatus, such as is described in DE 44 02 236 A1, it will be possible, for example, for the cleaning device to switch the shaving apparatus on and off at the correct moment in the cleaning cycle and also, where required, to charge a storage battery accommodated in the shaving apparatus.

From DE 196 06 719 C2 there is known an electric shaving apparatus having a controller capable of issuing a signal indicative of the need to clean the shaving apparatus, and a cleaning device for a shaving apparatus which simultaneously acts as a holder for the shaving apparatus. When the shaving apparatus is inserted in the cleaning device, the controller can be connected via the mains contact of the shaving apparatus to the cleaning device in such a way that a transmission of signals between the shaving apparatus and the cleaning device is possible. To prevent the cleaning device from performing a cleaning operation unnecessarily each time the shaving apparatus is placed back in its holder, the cleaning device is activated only when the controller sends a corresponding signal to the cleaning device. Hence a shaving apparatus which has no controller to issue a cleaning signal cannot be cleaned in this cleaning device.

SUMMARY

It is therefore an object of the present invention to provide a supplementary device for a small electric device which is also capable of interacting with small electric devices lacking a controller.

It is another object of the present invention to provide a method for detecting the presence of an electric and/or magnetic connection between the devices.

To accomplish this object, a supplementary device, such as a charging, cleaning and/or diagnosis device, is provided with at least one connection via which it is electrically and/or magnetically connectable to the small electric device, such as an electric hair cutting or hair removal apparatus, particularly an electric shaving apparatus, or an electric toothbrush. With the detection arrangement the supplementary device can automatically identify whether it is connected to a small electric device, thus making it unnecessary for the small electric device to issue a signal or for the user to operate a switch or some other actuator. User friendliness is thus increased and maloperation ruled out. Furthermore, the actuator otherwise needed on the device can be omitted, resulting in a notable cost advantage.

A particularly simple detection arrangement monitors an electric and/or magnetic quantity prevailing at the connection of the supplementary device. In the case of an electric connection involving at least two terminals, for example, the electric resistance or the voltage between the terminals will vary when the devices are connected or disconnected. The same applies likewise to a magnetic or electromagnetic connection. If the electric and/or magnetic quantity varies by more than a certain minimum amount from, for example, the state existing when no small electric device is connected to the supplementary device, then the detection arrangement will issue a corresponding signal indicating that the devices are connected. Preferably, however, the detection arrangement does not evaluate the variation of the electric and/or magnetic quantity but includes a comparator which compares the electric and/or magnetic quantity with at least one reference value. If the electric and/or magnetic quantity residing at the connection is of an amount lying below the reference value, for example, the small electric device is connected to the supplementary device and vice versa.

According to a preferred further aspect of the present invention, the detection arrangement is also capable of establishing the particular type of small electric device connected to the supplementary device. For this purpose a supplementary device of the present invention can be connected via a further terminal to the small electric device and includes, for example, a microcontroller which connects a signal source, particularly a voltage source, to said terminal via a switch controllable by the microcontroller: either a first or a second type of device is connected to the supplementary device depending on whether the electric and/or magnetic quantity between the two other terminals then changes.

If, for example, the supplementary device is a cleaning and charging device for shaving apparatuses which operates on the basis of the cleaning program known from DE 44 02 236 A1, which involves switching on and off of the shaving apparatus while being cleaned by the supplementary device in order to achieve an optimal cleaning effect, then the cleaning and charging device must be able to detect, for example, whether the connected shaving apparatus contains a storage battery or not. In the case of a shaver with a built-in storage battery and a motor able to draw current only from the storage battery, it may first be necessary to charge the storage battery before the cleaning program can be executed. By contrast, shavers without a storage battery are supplied with electricity directly from the cleaning device during cleaning.

In a further aspect the supplementary device includes several comparators which compare the electric and/or magnetic quantity present at the two terminals of the supplementary device with several reference values. Depending on between which reference values the electric and/or magnetic quantity lies, either a particular type of small electric device or no small electric device is connected to the supplementary device.

The present invention will be explained in the following with reference to a cleaning device and an electric shaving apparatus as an embodiment for a supplementary device and a small electric device illustrated in the accompanying drawing. Further embodiments are dealt with in the description.

DETAILED DESCRIPTION

Figure 1:
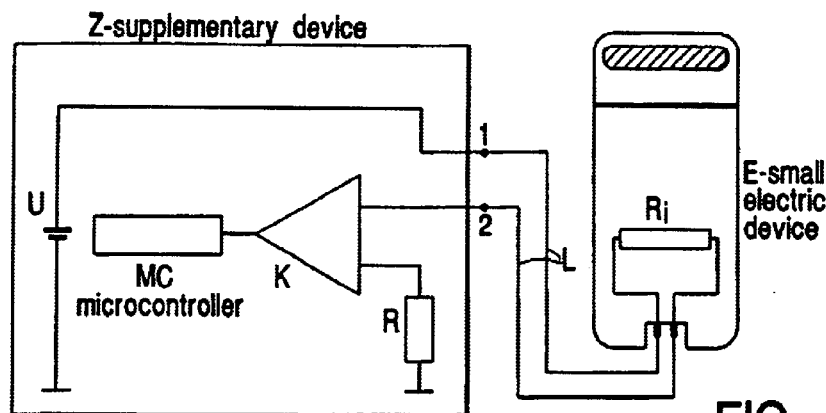
FIG. 1 is a schematic diagram of a detection circuitry for a cleaning device and an electric shaving apparatus.

According to FIG. 1, a supplementary device Z comprises a voltage source U, which is connected to a first terminal 1 of the supplementary device Z. The supplementary device Z further comprises a microcontroller MC, which is connected to the output of a comparator K. A reference voltage produced by a resistor R is applied to the one input of the comparator K having its other input connected to a second terminal 2 of the supplementary device Z. A small electric device E also has two terminals, which are connected by an electric lead L to the two terminals 1, 2 of the supplementary device Z. The small electric device E contains an internal resistor, which is schematically represented in FIG. 1 by a resistor Ri connected between the terminals of the small electric device E.

In this embodiment the supplementary device Z continuously measures the resistance across its terminals 1, 2, which is practically infinite in magnitude when no small electric device E is connected. If, on the other hand, a small electric device E is connected to the terminals 1, 2 of the supplementary device Z, an electric current will flow through the internal resistor of the small electric device E on account of the voltage supplied by the voltage source U, resulting in a corresponding voltage at the second terminal 2 of the supplementary device Z, which is compared by the comparator K with the reference voltage. If the internal resistance of the small electric device E is small enough, the output of the comparator changes from "low" to "high" or vice versa. This enables the microcontroller MC to detect that the supplementary device Z is connected to a small electric device E.

In other embodiments there are more than two electric terminals, of which two are used, for example, for the supply of electricity to the small electric device and a third is provided specially to detect the connection and/or the type. For this purpose the third terminal is connected, for example, to a resistor referred to as a pull-up or pull-down resistor, whose resistance varies according to the type of small electric device. The supplementary device is then able to identify the type of small electric device from the measured resistance or from the voltage measured at the third terminal. Instead of an electric connection it is also possible to provide an inductive coupling between, for example, a charging device and a small electric device.

Figure 4:
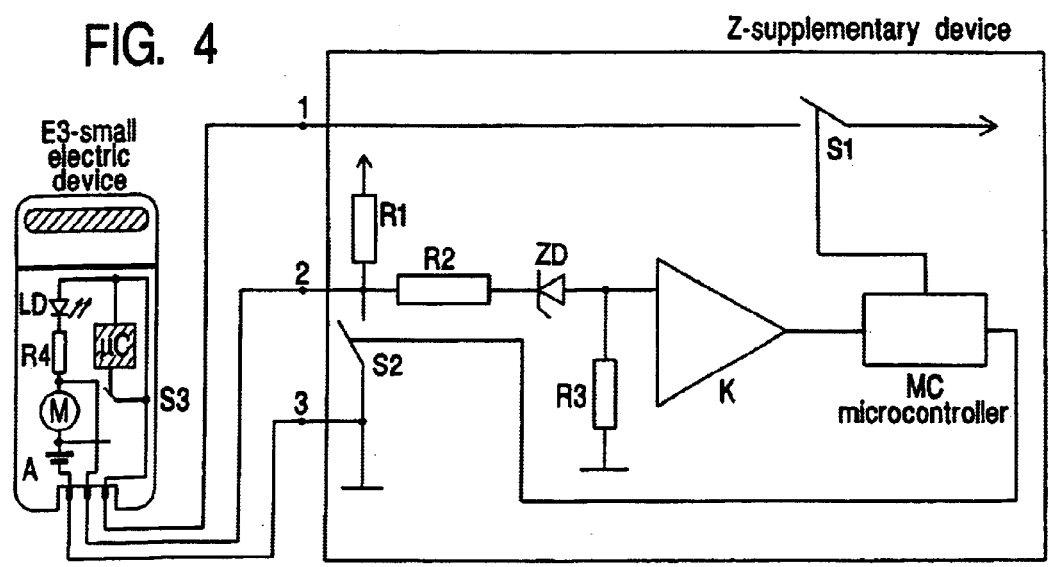
FIG. 4 is the simplified circuit diagram of FIG. 2, but with a shaving apparatus whose storage battery can be charged by the cleaning device.
Figure 2:
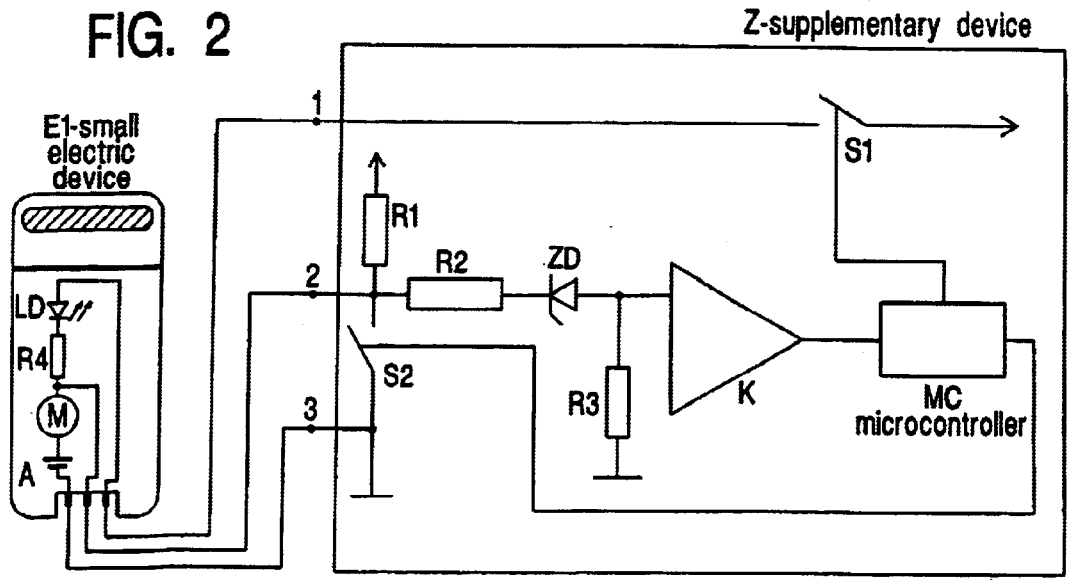
FIG. 2 is a simplified circuit diagram of a cleaning device and an electric shaving apparatus containing a storage battery.
Figure 3:
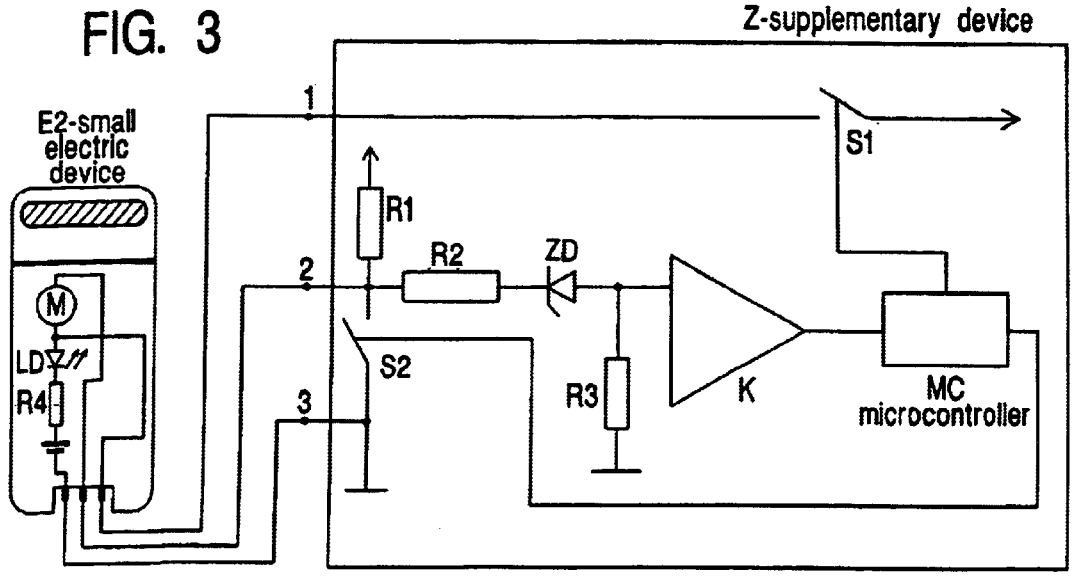
FIG. 3 is the simplified circuit diagram of the cleaning device of FIG. 2 and a shaving apparatus containing no storage battery.

The supplementary device Z shown in simplified form in FIGS. 2, 3 and 4 has three terminals. The first terminal 1 is connected via a first switch S1 to a voltage source symbolized by an arrow, which is connected in turn to the one end of a first resistor R1. The first resistor R1 has its other end connected to the second terminal 2. Between the second and the third terminal is a second switch S2. Both switches S1, S2 are controllable by a microcontroller MC. The third terminal 3 is connected to ground. The second terminal 2 is connected furthermore to the one end of a second resistor R2. The second resistor R2 has its other end connected to the cathode of a Zener diode ZD. The Zener diode ZD has its anode connected to a first input of a comparator K and to the one end of a third resistor R3. The other end of the third resistor R3 is connected to ground. The output of the comparator K is connected to the microcontroller MC. The comparator K has a second input, not shown in FIGS. 2, 3 and 4, which is connected to a reference voltage source which likewise is not shown.

As an embodiment for a small electric device FIG. 2 shows an electric shaving apparatus E1 containing a storage battery A, whereas FIG. 3 shows an electric shaving apparatus E2 containing no storage battery. Both shaving apparatuses have three terminals each, which are electrically connected to the corresponding terminals 1, 2, 3 of the supplementary device Z. Furthermore, both shaving apparatuses have a motor M and a series circuit comprised of a fourth resistor R4 and a light-emitting diode LD. In the shaving apparatus E1 shown in FIG. 2 there is a series circuit comprised of the storage battery A and the motor M positioned between the second and the third terminal, while the series circuit comprised of the fourth resistor R4 and the light-emitting diode LD is positioned between the first and the second terminal. In the shaving apparatus E2 shown in FIG. 3 the motor M is positioned between the first and the second terminal, and the series circuit comprised of the fourth resistor R4 and the light-emitting diode LD is positioned between the first and the third terminal.

A method of the present invention by which the cleaning device can identify whether a shaving apparatus is connected to the terminals and, if so, which type is involved, will be explained in the following with reference to FIGS. 2 and 3. The steps required to perform this method are controlled by the microcontroller MC.

In an initial position, in which the cleaning device is not connected to a shaving apparatus, the two switches S1, S2 are not closed. The Zener diode ZD is conducting, and at the first input of the comparator K is a voltage determined by the voltage of the voltage source and the resistances of the first, second and third resistors R1, R2, R3. Said resistances and the voltage of the reference voltage source are of a magnitude causing the output of the comparator K to be "high". If a shaving apparatus is now connected to the cleaning device, the voltage residing at the second terminal 2 will now be lower, corresponding in the case of a shaver with a storage battery A to approximately the voltage of the storage battery and being determined in the case of a shaver without a storage battery by the resistances of the light-emitting diode LD and the first and fourth resistors R1, R4. The Zener diode ZD is non conducting, therefore, and the third resistor R3 connects the first input of the comparator K to ground, whereupon the output of the comparator K becomes "low". The microcomputer MC can identify from the "low" potential that a shaver is connected to the cleaning device.

In order to then determine the type of shaver connected, the first switch S1 is closed temporarily by the microcontroller MC. In the case of a shaver with a storage battery A the voltage at the second terminal 2 does not change as the result but continues to be determined by the voltage of the storage battery A. The output of the comparator K remains accordingly at "low". In the case of a shaver without a storage battery, on the other hand, the motor M of the shaver is connected in parallel to the first resistor R1 as the result, causing the voltage at the second terminal 2 to increase temporarily to the extent that the Zener diode is temporarily placed in conduction and the output of the comparator K becomes "high" temporarily. Hence, if the output of the comparator K also changes over temporarily to "high" when the first switch S1 is closed temporarily, the microcontroller MC knows that a shaver without a storage battery is connected. By contrast, if the output of the comparator K remains at "low", a shaver with a storage battery A is connected.

If the motor M of the shaver is to be switched on in the course of a cleaning operation, the second switch S2, will be closed by the microcontroller MC. When a shaver with a storage battery A is connected, the motor M is supplied with electricity by the storage battery A. When the connected shaver has no storage battery, the motor M is supplied with electricity, by the cleaning device.

In a preferred embodiment shown in FIG. 4, the supplementary device and the small electric device include an arrangement for the transmission of data as described, for example, in DE 198 17 273 initially referred to, the contents of which are hereby incorporated in the subject-matter of the present application by express reference. Data is transmitted via the first terminal 1. A shaving apparatus E3 containing a storage battery A and a microcontroller C required for the data transmission is shown in FIG. 4 as an embodiment for a small electric device. The shaving apparatus also has a third switch S3 which is controllable by the microcontroller C. To charge the storage battery A the microcontroller C of the shaving apparatus E3 closes the third switch S3, and the microcontroller MC of the supplementary device Z closes the first switch S1, whereby a charging circuitry, not shown in FIG. 4, in the shaving apparatus is connected via the first terminal 1 to the voltage source of the supplementary device. The supplementary device thus serves also as a charging device for the storage battery A in the shaving apparatus.

According to the present invention, data transmission is effected by the supplementary device feeding an electric current, an electric voltage or an electric and/or magnetic field to the small electric device, which current/voltage/field is modulated with a corresponding data signal by the small electric device or by the supplementary device, depending on the required direction of data transmission. Demodulation takes place in the respective receiving device. One method which is particularly easy to implement performs the modulation by switching on and off the electric current, the voltage or the field.

If, with the devices shown in FIG. 4, data is to be transmitted from the supplementary device Z to the small electric device E3, the microcontroller MC in the supplementary device generates a data signal driving the first switch S1, causing it to be opened and closed accordingly so that the voltage residing at the first terminal 1 is amplitude-modulated by the on/off switching operation. At the same time the microcontroller C of the small electric device E3 detects, with the aid of a sensor such as a comparator, that the voltage is modulated, demodulating the received data.

Data transmission in reverse direction, that is, from the small electric device to the supplementary device, can be performed in similar manner. By transmitting suitable control signals the devices are thus able to set the switches in the required position for charging the storage battery A. Once the storage battery is sufficiently charged, the shaver can transmit a corresponding data signal to the supplementary device, whereby the first switch S1 is opened, terminating the charging operation.

What is claimed is:

1. A cleaning device for an electric razor, the cleaning device comprising:
   at least one connection comprising a first and a second terminal for connecting to the electric razor; and
   an electrical circuit including at least one comparator for comparing at least one of an electric and magnetic quantity prevailing across said first and said second terminals with at least one reference value to detect whether the cleaning device is at least one of electrically and magnetically connected to the electric razor.

2. The cleaning device of claim 1, wherein the electrical circuit is configured to discriminate between individual types of electric razors.

3. The cleaning device of claim 1 further comprising a third terminal and wherein the electrical circuit further comprises a microcontroller, said electrical circuit including a first switch controllable by said microcontroller and having one end connected to said third terminal and a second end connected to a signal source.

4. The cleaning device of claim 3, wherein the microcontroller is connected to an output of the comparator.

5. The cleaning device of claim 3, further comprising a second switch that is controllable by the microcontroller and operable to turn the electric razor on and off.

6. The cleaning device of claim 1, comprising a charger configured to charge a battery of the electric razor.

7. The cleaning device of claim 1, comprising a diagnostic device configured to evaluate the electric razor.

8. A cleaning device for an electric razor, the cleaning device comprising:
   at least one connection for connecting to the electric razor; and
   means for comparing at least one of an electric and magnetic quantity prevailing at said connection with at least one reference value to detect whether the cleaning device is at least one of electrically and magnetically connected to the electric razor.

9. A charger-cleaner for an electric razor, the charger-cleaner comprising:
   at least one connection comprising a first and a second terminal for connecting to the electric razor; and
   means for comparing at least one of an electric and magnetic quantity prevailing across said first and said second terminals with at least one reference value to detect whether the charger-cleaner is at least one of electrically and magnetically connected to the electric razor.

10. A method of cleaning an electric razor, the method comprising:
    connecting a first and a second terminal of the electric razor to a cleaning device via at least one of an electric and a magnetic connection;
    comparing at least one of an electric and magnetic quantity prevailing across the first and second terminals with at least one reference value to detect the at least one of an electric and a magnetic connection between the cleaning device and the electric razor; and in response to detecting the at least one of an electric and a magnetic connection between the cleaning device and the electric razor, cleaning the electric razor.

11. The method of claim 10, further comprising discriminating between individual types of electric razors.

12. The method of claim 11, wherein the types of electrical razors include battery powered razors and non-battery powered razors.

13. The method of claim 10, further comprising charging a battery of the electric razor.

14. The method of claim 10, wherein cleaning the electric razor comprises activating the electric razor.

* * * * *